(12) United States Patent
Heitzenrater et al.

(10) Patent No.: US 8,376,900 B2
(45) Date of Patent: Feb. 19, 2013

(54) CLUTCH ASSEMBLY

(75) Inventors: Scott William Heitzenrater, Orion, MI (US); John A. Diemer, Farmington Hills, MI (US); Douglas John Dwenger, Plymouth, MI (US); Larry D. Diemer, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 590 days.

(21) Appl. No.: 12/640,778

(22) Filed: Dec. 17, 2009

(65) Prior Publication Data

US 2011/0147155 A1 Jun. 23, 2011

(51) Int. Cl.
*F16H 3/44* (2006.01)
*F16D 23/00* (2006.01)
(52) U.S. Cl. ...................................... 475/318; 192/55.1
(58) Field of Classification Search .................. 475/318; 192/55.1, 56.6
See application file for complete search history.

(56) References Cited

U.S. PATENT DOCUMENTS

| | | | |
|---|---|---|---|
| 5,029,688 A * | 7/1991 | Hayakawa et al. | 192/113.32 |
| 6,830,531 B1 * | 12/2004 | Koenig et al. | 475/263 |
| 7,101,306 B2 * | 9/2006 | Blair et al. | 475/318 |
| 2004/0043859 A1 * | 3/2004 | Yurgil et al. | 475/318 |
| 2006/0025278 A1 * | 2/2006 | Antonov et al. | 475/318 |

* cited by examiner

*Primary Examiner* — Edwin A Young

(57) ABSTRACT

A clutch assembly for transmitting a first torque between a first member and a second member includes a first clutch and a second clutch. The first clutch is disposed between the first member and the second member and has a predetermined design torque. The second clutch is disposed in series with the first clutch between the first member and the second member and has a predetermined holding torque that is less than the predetermined design torque. The second clutch allows rotation between the first member and the second member when the first torque is greater than the predetermined holding torque.

23 Claims, 4 Drawing Sheets

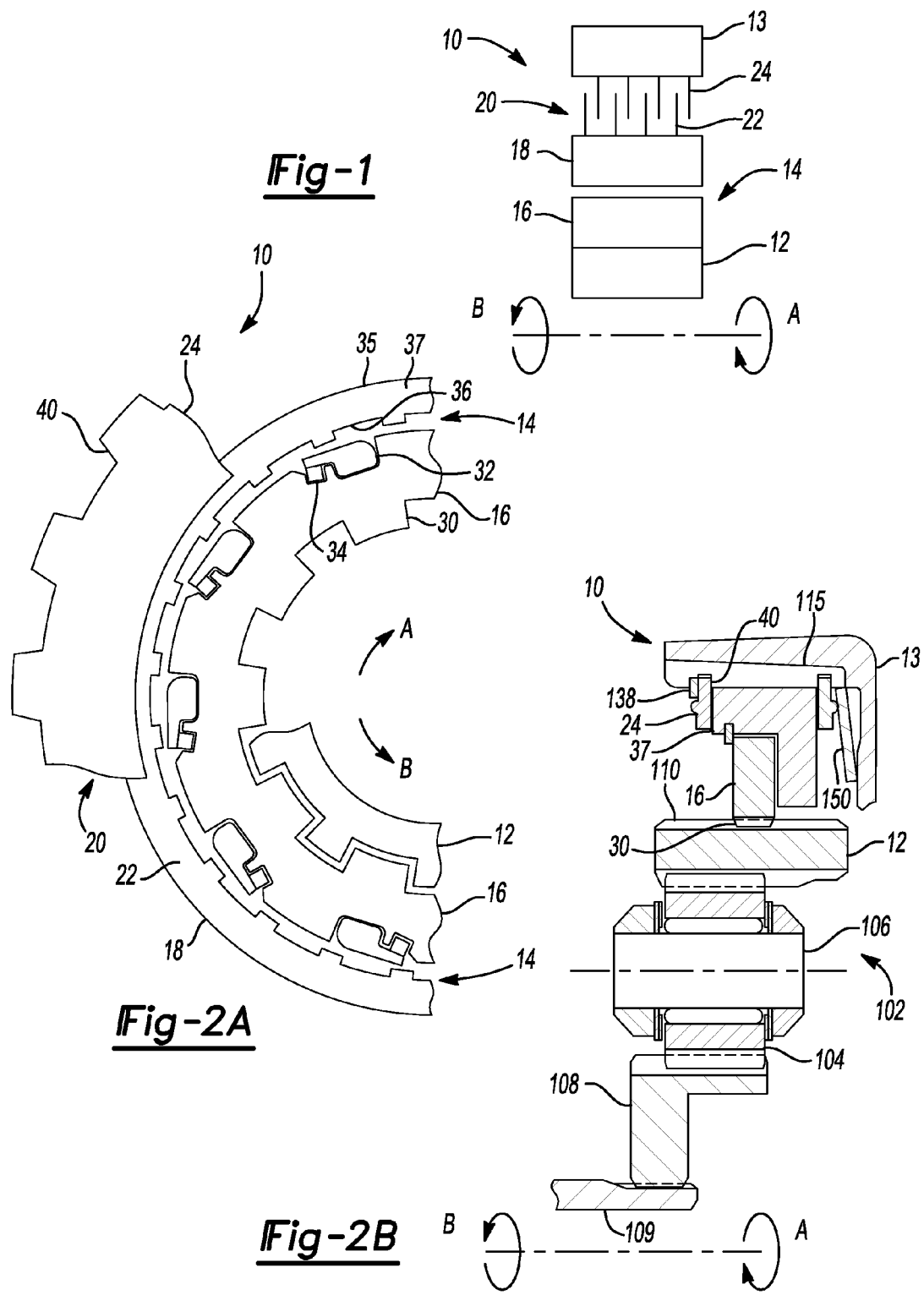

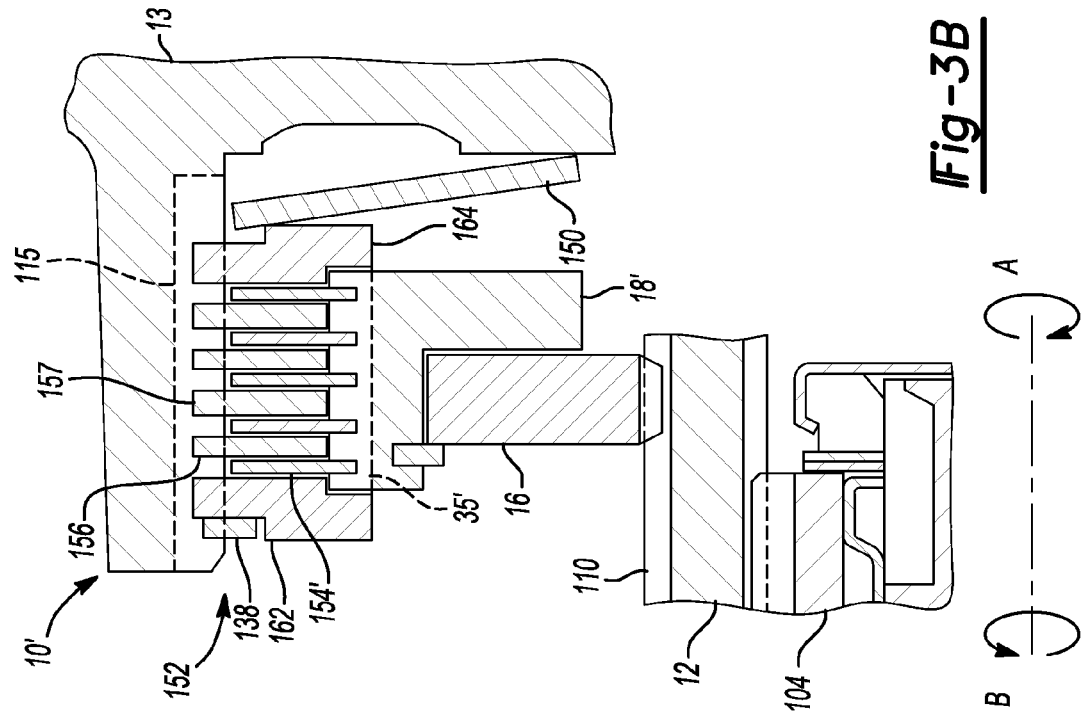
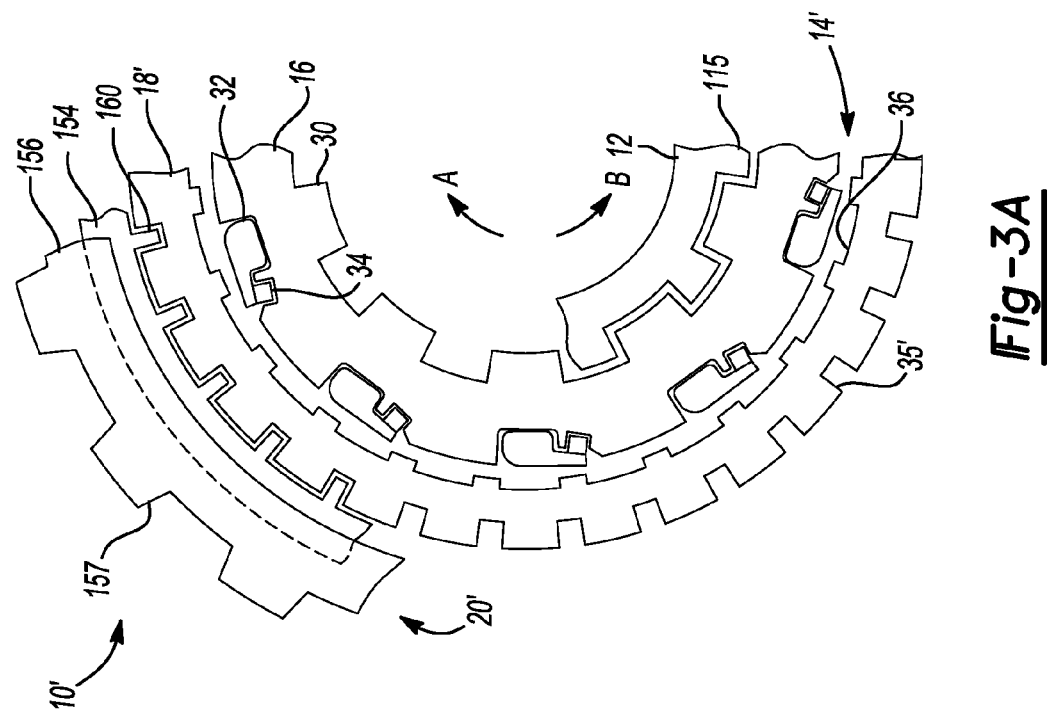

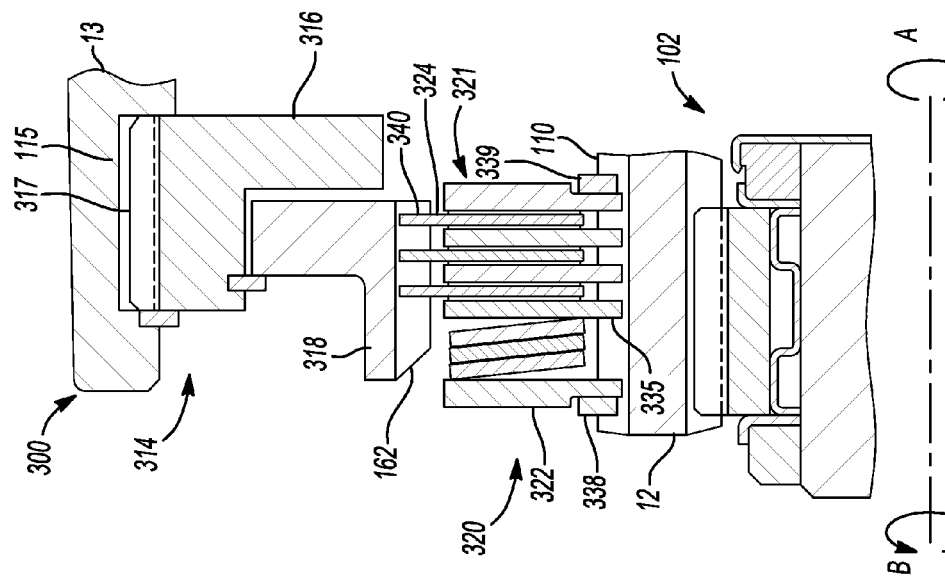
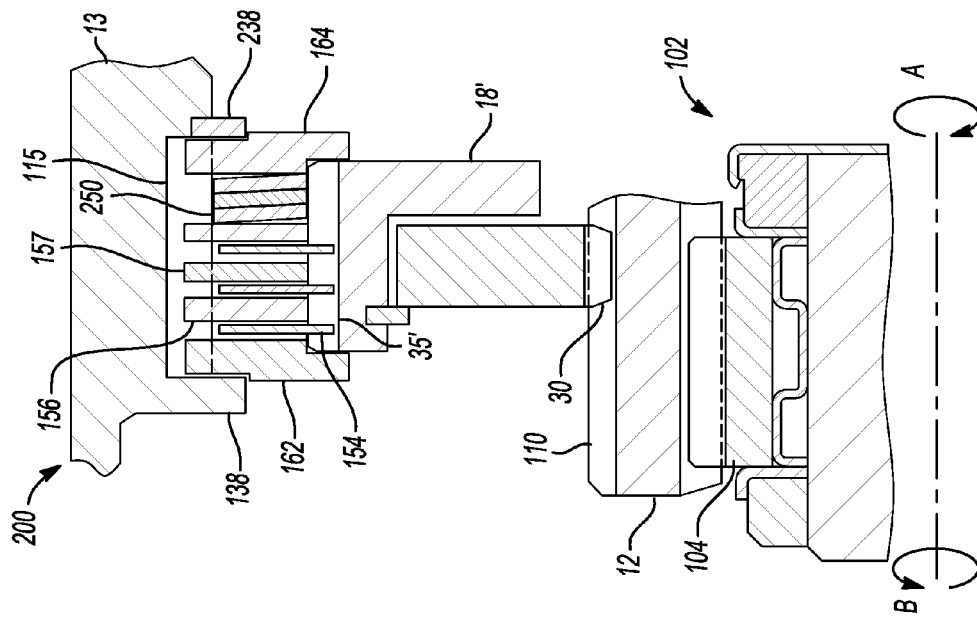

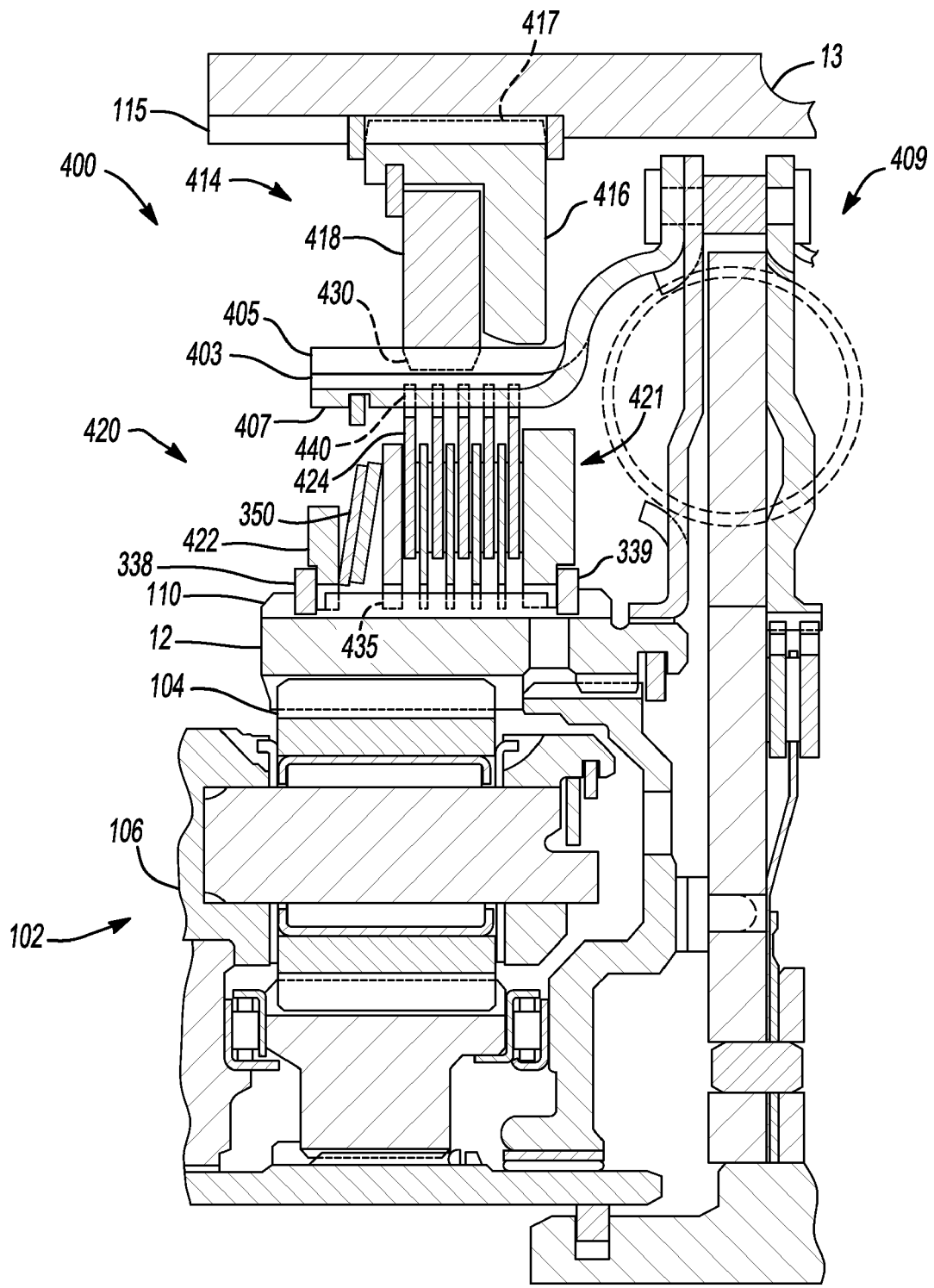
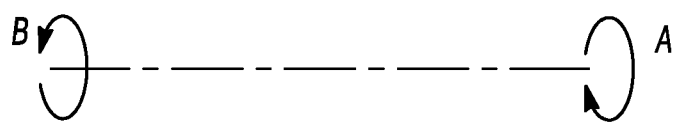
Fig-6

US 8,376,900 B2

CLUTCH ASSEMBLY

TECHNICAL FIELD

The present disclosure relates to torque transmission assemblies, and more particularly to torque transmission assemblies that include protection against torque overload.

BACKGROUND

The statements in this section merely provide background information related to the present disclosure and may or may not constitute prior art.

Automatic transmissions provide a plurality of forward and reverse speed or gear ratios by selectively actuating one or more brakes or clutches. One type of brake or clutch useful in automatic transmissions is known as a one-way clutch. A one-way clutch includes a "locked" mode in one rotational direction and a "freewheel" mode in the opposite rotational direction. A one-way or selectable one-way clutch is designed with a torque limit that is moderately higher than the expected operating torque of the system. Exceeding the torque limit may cause permanent damage to the one-way clutch or other transmission components. Due to certain conditions, the drive train or engine may produce a torque spike which transmits a torque higher than the expected operating torque of the system. Torque spikes may exceed the torque limit of the one-way clutch or other transmission components, causing permanent damage or failure in the one-way clutch or other transmission components.

One solution to account for torque spikes includes designing one-way clutches with a torque limit high enough to withstand the high torque spikes so that the one-way clutch is not damaged. However, designing the one-way clutch with a higher torque limit often results in more mass, higher cost, and more spin loss in the one-way clutch. Thus, there is a need for a new and improved clutch assembly that protects the one-way clutch from torque spikes in excess of the expected operating torque while minimizing increases in mass, cost, and inefficiencies.

SUMMARY

In an aspect of the present disclosure, a clutch assembly for transmitting a first torque between a first member and a second member includes a first clutch and a second clutch. The first clutch is disposed between the first member and the second member and has a predetermined design torque. The second clutch is disposed in series with the first clutch between the first member and the second member. The second clutch has a predetermined holding torque, wherein the predetermined holding torque is less than the predetermined design torque. The second clutch allows rotation between the first member and the second member when the first torque is greater than the predetermined holding torque.

In another aspect of the present invention, the first clutch is a one-way clutch and the second clutch is a friction clutch.

In yet another aspect of the present invention, the clutch assembly further includes a biasing member continuously engaging the friction clutch.

In yet another aspect of the present invention, the first member is a rotatable member in an automobile transmission and the second member is a stationary member in the automobile transmission.

In yet another aspect of the present invention, the rotatable member is a ring gear of a planetary gear set of the automobile and the stationary member is a transmission housing of the automobile transmission.

In yet another aspect of the present invention, the one-way clutch is connected to the rotatable member and the friction clutch is connected between the one-way clutch and the stationary member.

In yet another aspect of the present invention, the friction clutch is connected to the rotatable member and the one way clutch is connected between the friction clutch and the stationary member.

In yet another aspect of the present invention, the one-way clutch includes a first race rotatably coupled to the first member and a second race opposing the first race, and wherein the friction clutch includes at least one first friction element rotatably coupled to the second race of the one-way clutch and includes at least one second friction member opposing the at least one first friction member and rotatably coupled to the second member.

In yet another aspect of the present invention, the one-way clutch includes a first race rotatably coupled to the second member and a second race opposing the first race, and wherein the friction clutch includes at least one first friction element rotatably coupled to the second race of the one-way clutch and includes at least one second friction element opposing the at least one first friction member and rotatably coupled to the second member.

In yet another aspect of the present invention, the clutch assembly further includes a Belleville spring engaging the friction clutch.

In yet another aspect of the present invention, the clutch assembly further includes a third member disposed between the first member and the second member. The third member is rotatably coupled to at least one of the friction clutch and the one-way clutch. The third member selectively transmits a second torque to the first member in a first rotational direction and the first torque is transmitted from the first member to the second member in a second rotational direction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 1 is a schematic view of a clutch assembly in accordance with an embodiment of the present invention;

FIG. 2A is a partially cut-away side view of a clutch assembly in accordance with an embodiment of the present invention;

FIG. 2B is a partial cross-sectional view of the clutch assembly of FIG. 2A in accordance with another embodiment of the present invention;

FIG. 3A is a partially cut-away side view of a clutch assembly in accordance with an embodiment of the present invention;

FIG. 3B is a partial cross-sectional view of the clutch assembly of FIG. 3A in accordance with another embodiment of the present invention;

FIG. 4 is a partial cross-sectional view of a clutch assembly in accordance with another embodiment of the present invention;

FIG. 5 is a partial cross-sectional view of a clutch assembly in accordance with another embodiment of the present invention; and FIG. 6 is a partial cross-sectional view of a clutch assembly in accordance with another embodiment of the present invention.

DETAILED DESCRIPTION

Referring to the drawings, wherein like reference numbers refer to like components, in FIG. 1 a schematic view of a clutch assembly 10 is illustrated, in accordance with an embodiment of the present invention. The clutch assembly 10 either transmits torque or allows rotation between a first member 12 and a second member 13 depending on the operating condition, as will be described below. The first member 12 is generally cylindrical or annular in shape. In the example provided, the first member 12 is a ring gear of a planetary gear set in a transmission of an automobile. However, the first member 12 may be other types of driven gears, shafts, or members disposed in other environments. The second member 13 is generally annular in shape. In the example provided, the second member 13 is a housing in the transmission of an automobile. Again, the second member 13 may take other forms, such as gears, shafts, or members without departing from the scope of the present invention. A one-way clutch 14 is disposed between the first member 12 and the second member 13 and includes a first race 16 that opposes a second race 18. The first race 16 is rotatably coupled to the first member 12. In the example provided, the one-way clutch 14 allows the first race 16 to rotate relative to the second race 18 in a first direction A, and transmits torque when the first race 16 rotates in a second direction B relative to the second race 18. However, the one-way clutch 14 may alternatively allow rotation in the second direction B and transmit torque in the first direction A. In the example provided, the one-way clutch 14 is a mechanical diode one-way clutch. However, the one way clutch 14 may be a selectable one-way clutch and may be of a different type, such as a sprag clutch, a roller clutch, a rocker clutch, or a dog clutch. The materials, dimensions, and design of the one-way clutch 14 determine a design torque of the one-way clutch 14. The design torque is the amount of torque between the first race 16 and the second race 18 that the one-way clutch 14 is designed to transmit without damaging the components of the one-way clutch 14. Preferably, the design torque is greater than a normal operating torque between the first member 12 and the second member 13.

A friction clutch 20 is disposed between the one way clutch 14 and the second member 13. The friction clutch 20 includes at least one first friction element 22 and at least one second friction element 24 that is selectably engageable with the first friction element 22. Preferably, the friction clutch 20 is applied by a biasing member or spring, however the friction clutch 20 may be actuated by other means without departing from the scope of the present invention. In the example provided, the first friction element 22 is rotatably coupled to the second race 18 of the one-way clutch 14 and the second friction element 24 is rotatably coupled to the second member 13. The friction clutch 20 has a predetermined holding torque that determines when the first friction element 22 will slip relative to the second friction element 24. An actuation force between the first and second friction elements 22, 24 and the friction properties of the first and second friction elements 22, 24 determine the predetermined holding torque. Preferably, the predetermined holding torque is less than the design torque of the one-way clutch 14 and greater than the normal operating torque between the first member 12 and the second member 13.

In alternative embodiments, the friction clutch 20 and the one-way clutch 14 may be disposed in other locations as long as the friction clutch 20 is in series relationship with the one-way clutch 14. For example, the clutches 14, 20 are in series when substantially all of the torque transmitted by the first member 12 to the second member 13 is also transmitted by each of the clutches 14, 20. In one alternative embodiment the friction clutch 20 is connected to the first member 12 and the one-way clutch 14 is connected between the friction clutch 20 and the second member 13.

During operation of the embodiment provided, the first member 12 is driven in either the first direction A or the second direction B by a component in the transmission of an automobile. The first member 12 transmits torque to the first race 16 of the one-way clutch 14. When the first race 16 rotates in the first direction A with respect to the second race 18, the first race 16 does not transmit torque to the second race 18 and the one-way clutch rotates freely. When the first race 16 rotates in the second direction B with respect to the second race 18, the first race transmits torque to the second race 18 in the second direction B. The second race 18 transmits torque to the first friction element 22, which transmits torque to the second friction element 24 when the friction clutch 20 is applied, which transmits torque to the second member 13. When the torque on the friction clutch 20 exceeds the predetermined holding torque, such as during a torque spike event, the friction clutch 20 allows relative rotation between the one-way clutch 14 and the second member 13 to keep the torque transmitted by the one-way clutch 14 below the design torque. Because the second member 13 is a transmission housing, the ring gear is locked in the second direction B, allowing a sun gear and a planetary gear carrier of the planetary gear set to rotate relative to each other without rotating the ring gear in the second direction B.

Referring now to FIG. 2A, the clutch assembly 10 is shown in a partially cut away side view in accordance with an embodiment of the present invention. The first race 16 of the one-way clutch 14 includes inner splines 30 and at least one rocker 32 that is rotatable by a spring 34 into a pocket 36 in the second race 18. The number, placement, and size of the rockers 32 contribute to the design torque of the one-way clutch 14. Exceeding the design torque on the one-way clutch 14 may cause damage to the rockers 32 or other components and lead to failure of the one-way clutch 14. The second race 18 includes an outer surface 35 that opposes the second member 13. In the example provided, a surface 37 on each axial side of the second race 18 is the first friction element 22 of the friction clutch 20. The second friction element 24 radially overlaps and axially contacts the surface 37 of the second race 18 to form friction clutch 20. The second friction element 24 is rotatably coupled to the second member 13 by splines 40.

When the first race 16 rotates in the first direction A relative to the second race 18, the second race 18 rotates the rocker 32 out of engagement with the pocket 36 and the one-way clutch 14 rotates freely. When the first race 16 rotates in the second direction B relative to the second race 18, the rocker 32 engages the pocket 36 to transmit torque between the first race 16 and the second race 18. The surface 37 of the second race 18 transmits torque to the second friction element 24 which transmits the torque to the second member 13. The surface 37 will slide relative to the second friction element 24 when the torque transmitted from the surface 37 to the second friction element 24 exceeds the holding torque of the friction clutch 20, thereby protecting the one-way clutch 14 from exceeding the design torque. The surface 37 will remain rotationally stationary with respect to the second friction element 24 when the torque transmitted from the surface 37 to the second friction element 24 is less than the holding torque of the friction clutch 20.

Referring now to FIG. 2B, a partial cross sectional view of the clutch assembly 10 of FIGS. 1 and 2 is shown. In the example provided, the clutch assembly 10 is disposed in an automatic transmission of an automobile. A planetary gear set 102 includes a plurality of planetary gears 104 rotatably supported on a carrier member 106. The planetary gears 104 are meshed with a sun gear 108 that is connected to a driving or a driven component 109 in the automobile. The planetary gears 104 are also meshed with the first member 12, which is a ring gear in the example provided. The first member 12 has splines 110 that engage with the splines 30 of the first race 16 of the one-way clutch 14.

The splines 40 of the second friction element 24 engage with splines 115 on the second member 13. An axial retention member 138 is disposed adjacent to one of the second friction elements 24 and is axially fixed to the second member 13. A spring 150 is disposed between the second member 13 and another of the second friction elements 24 to axially compress the second friction elements 24 with the friction surfaces 37 of the second race 18 of the one-way clutch 14. The size and shape of the spring 150 are predetermined to produce a spring force on the friction elements 24 that gives the friction clutch 20 a predetermined holding torque that is less than the design torque of the one-way clutch 14. In the example provided, the spring 150 is a single Belleville spring. However, other types of biasing members or other numbers and types of springs may be used without departing from the scope of the present invention.

During operation, torque is transmitted through the splines 110 of the first member 12 to the splines 30 of the first race 16 of the one-way clutch 14. When the first race 16 is rotating in the first direction A with respect to the second race 18, the one-way clutch 14 allows free rotation. When the torque on the first race is in the second direction B, the first race 16 transmits torque to the second race 18. The friction surfaces 37 transmit torque to the second friction elements 24 up to the predetermined holding torque of the friction clutch 20. When the torque on the second race 18 of the one-way clutch 14 is greater than the predetermined holding torque of the friction clutch 20, the friction surfaces 37 rotate with respect to the second friction elements 24, transmitting only a sliding or slipping frictional force between the first member 12 and the second member 13. The splines 40 of the second friction elements 24 transmit torque to the splines 115 of the second member 13. Because the second member 13 is a transmission housing in this example, the torque does not move the second member 13 and the clutch assembly 10 acts as a brake or a lock to limit rotation of the first member 12 when the torque on the clutch assembly 10 is less than the predetermined holding torque of the friction clutch 20.

Referring now to FIGS. 3A and 3B, a clutch assembly 10' is shown in accordance with an embodiment of the present invention. The clutch assembly 10' is similar to the clutch assembly 10, where like reference numbers refer to like components, however the clutch assembly 10' includes a friction clutch 20' and a one-way clutch 14' that includes a second race 18'. The second race 18' is substantially similar to the second race 18, however the second race 18' includes splines 35' instead of the surface 35. The friction clutch 20' includes a clutch pack 152 having first friction elements or friction plates 154 interleaved with second friction elements or reaction or steel plates 156. The friction plates 154 include inner splines 160 that engage with the splines 35' of the second race 18'. The steel plates 156 include outer splines 157 that engage the splines 115 of the second member 13. A first end element 162 and a second end element 164 are axially adjacent to the clutch pack 152. The end elements 162, 164 radially overlap the second race 18' of the one-way clutch 14' to axially retain the one-way clutch 14'.

The clutch assembly 10' operates substantially the same as the clutch assembly 10, however the predetermined force of the friction clutch 20' is determined at least partially by the force from the spring 150 on the clutch pack 152.

Referring now to FIG. 4, a partial cross sectional side view of a clutch assembly 200 is shown in accordance with an embodiment of the present invention. The clutch assembly 200 is similar to the clutch assembly 10', where like numbers refer to like components. The clutch assembly 200, however, includes a second axial retention element 238 and plurality of springs 250 instead of the spring 150. The second axial retention element 238 is axially fixed to the second member 13. The plurality of springs 250 are disposed between the second axial retention element 238 and clutch pack 152 and are three Belleville springs in the present example. The springs 250, however, may be other types of biasing members without departing from the scope of the present invention.

The clutch assembly 200 operates substantially the same as the clutch assembly 10', however the predetermined force of the friction clutch 20' is determined at least partially by the force from the plurality of springs 250 on the clutch pack 152.

Referring now to FIG. 5, a partial cross sectional view of a clutch assembly 300 is shown in accordance with an embodiment of the present invention. The clutch assembly 300 is similar to clutch assembly 10', however clutch assembly 300 includes one-way clutch 314 instead of one-way clutch 14' and friction clutch 320 instead of friction clutch 20. The one-way clutch 314 includes a first race 316 having a plurality of splines 317 that engage with the splines 115 of the second member 13. A second race 318 opposes the first race 316 and includes a plurality of splines 330. The one way clutch 314 allows rotation between the second race 318 and the first race 316 in the first direction A, and transmits torque between the second race 318 and the first race 316 in the second direction B. It should be appreciated that the one-way clutch 314 may be a selectable one-way clutch and may be arranged to transmit torque in the first direction A and allow rotation in the second direction B without departing from the scope of the present disclosure.

Friction clutch 320 includes a clutch pack 321 having a plurality of first friction elements or reaction or steel plates 322 interleaved with a plurality of second friction elements or friction plates 324. The plurality of reaction plates 322 have splines 335 engaged with the splines 110 of the first member 12 of the planetary gear set 102. The plurality of friction plates 324 have splines 340 that engage with the splines 330 of the second race 318 of the one-way clutch 314. A first axial retention member 338 is axially fixed to the splines 110 to one axial side of the clutch pack 321 and a second axial retention member 339 is axially fixed to the splines 110 to the other axial side of the clutch pack 321. A plurality of springs 350 are disposed between two of the reaction plates 322 to compress the reaction plates and friction plates 322, 324 together along the splines 110, 330, respectively. The number, size, and shape of the springs 350 determine a holding torque for the friction clutch 320. In the example provided, the springs 350 are three Belleville springs. However, the springs 350 may be other types of biasing members or other numbers and types of springs without departing from the scope of the present invention.

During operation, the splines 110 of the first member 12 transmit torque to the reaction plates 322 through the splines 335. The reaction plates 322 transmit up to the holding torque to the friction plates 324 in the first or second directions A, B. When the torque on the friction plates 324 is greater than the predetermined holding torque, the reaction plates 322 slide with respect to the friction plates 324, transmitting only a sliding or slipping frictional force between the reaction plates 322 and the friction plates 324. The splines 340 of the friction plates 324 transmit torque to the splines 330 of the second race 318 of the one-way clutch 314. The second race 318 rotates freely in the first direction A with respect to the first race 316, but transmits torque from the second race 318 to the first race 316 in the second direction B. The splines 317 of the first race 316 of the one-way clutch 314 transmit torque to the splines 115 of the second member 13. Because the second member 13 is a transmission housing in this example, the torque does not move the second member 13 and the clutch assembly 314 acts as a brake or a lock to limit rotation of the first member 12 when the torque on the clutch assembly 314 is less than the predetermined holding torque of the friction clutch 320.

Referring now to FIG. 6, a partial cross sectional view of a clutch assembly 400 is shown in accordance with an embodiment of the present invention. The clutch assembly 400 is similar to clutch assembly 300, however clutch assembly 400 includes an third member 403, a one-way clutch 414 instead of one-way clutch 314, and friction clutch 420 instead of friction clutch 320. In the example provided, the clutch assembly 400 is disposed in a hybrid-electric vehicle transmission.

The third member 403 is disposed between the one-way clutch 414 and the friction clutch 420. A plurality of first splines 405 of the third member 403 opposes the one-way clutch 414 and a plurality of second splines 407 opposes the friction clutch 420. In the example provided, the third member 403 is a damper hub that is rotatably connected to a damper 409 that is rotatably connectable to an internal combustion engine (not shown).

The one-way clutch 414 includes a first race 416 having a plurality of splines 417 that engage with the splines 115 of the second member 13. A second race 418 opposes the first race 416 and includes a plurality of splines 430 that are engaged with the first splines 405 of the third member 403. The one way clutch 414 allows rotation between the second race 418 and the first race 416 in the first direction A, and transmits torque between the second race 418 and the first race 416 in the second direction B. It should be appreciated that the one-way clutch 414 may be a selectable one-way clutch and may be arranged to transmit torque in the first direction A and allow rotation in the second direction B without departing from the scope of the present disclosure.

Friction clutch 420 includes a clutch pack 421 having a plurality of first friction elements or reaction or steel plates 422 interleaved with a plurality of second friction elements or friction plates 424. The plurality of reaction plates 422 have splines 435 engaged with the splines 110 of the first member 12 of the planetary gear set 102. The plurality of friction plates 424 have splines 440 that engage with the second splines 407 of the third member 403.

During operation, the internal combustion engine may be either on or off. When the internal combustion engine is on, torque is transmitted in the first direction A through the damper 409 to the damper hub 403. Part of the torque is transmitted through the first splines 405 to the splines 430 of the second race 418 of the one-way clutch 414. The one-way clutch 414 allows rotation in the first direction A. The rest of the torque is transmitted through the second splines 407 to the splines 440 of the friction plates 424. The friction plates 424 transmit up to the holding torque to the reaction plates 422 in the first direction A. When the torque on the reaction plates 422 is greater than the predetermined holding torque, the reaction plates 422 slide with respect to the friction plates 424, transmitting only a sliding or slipping frictional force between the reaction plates 422 and the friction plates 424. The splines 435 of the reaction plates 422 transmit torque to the splines 110 of the first member 12. The torque from the internal combustion engine is then transmitted through the planetary gear set 102.

The clutch assembly 400 acts as a brake or lock when the internal combustion engine is turned off and the planetary gear set 102 is transmitting torque to the first member 12 in the second direction B. Torque is transmitted through the splines 110 of the first member 12 to the splines 435 of the reaction plates 422. The reaction plates 422 transmit up to the holding torque to the friction plates 424. When the torque on the friction plates 424 is greater than the predetermined holding torque, the reaction plates 422 slide with respect to the friction plates 424, transmitting only a sliding or slipping frictional force between the reaction plates 422 and the friction plates 424. The splines 440 of the friction plates 424 transmit the torque to the second splines 407 of the damper hub 403. The first splines 405 of the damper hub 403 transmit the torque to the splines 430 of the second race 418 of the one-way clutch 414. The second race 418 is locked with respect to the first race 416 in the second direction B, and the first race 416 transmits the torque from the splines 417 to the splines 115 of the second member 13. Because the second member 13 is a transmission housing, the one-way clutch 414 acts as a lock in the second direction B to resist rotation of the damper hub 403 and the ring gear 12.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A clutch assembly for transmitting a first torque between a first member and a second member, the clutch assembly comprising:
   a first clutch disposed between the first member and the second member, the first clutch having a predetermined design torque; and
   a second clutch disposed in series with the first clutch between the first member and the second member, the second clutch having a predetermined holding torque, wherein the predetermined holding torque is less than the predetermined design torque, and
   wherein the second clutch allows rotation between the first member and the second member when the first torque is greater than the predetermined holding torque.

2. The clutch assembly of claim 1, wherein the first clutch is a one-way clutch and the second clutch is a friction clutch.

3. The clutch assembly of claim 2, further including a biasing member continuously engaging the friction clutch.

4. The clutch assembly of claim 2, wherein the first member is a rotatable member in an automobile transmission and the second member is a stationary member in the automobile transmission.

5. The clutch assembly of claim 4, wherein the rotatable member is a ring gear of a planetary gear set of the automobile and the stationary member is a transmission housing of the automobile transmission.

6. The clutch assembly of claim 4, wherein the one-way clutch is connected to the rotatable member and the friction clutch is connected between the one-way clutch and the stationary member.

7. The clutch assembly of claim 4, wherein the friction clutch is connected to the rotatable member and the one way clutch is connected between the friction clutch and the stationary member.

8. The clutch assembly of claim 2, wherein the one-way clutch includes a first race rotatably coupled to the first member and a second race opposing the first race, and wherein the friction clutch includes at least one first friction element rotatably coupled to the second race of the one-way clutch and includes at least one second friction member opposing the at least one first friction member and rotatably coupled to the second member.

9. The clutch assembly of claim 2, wherein the one-way clutch includes a first race rotatably coupled to the second member and a second race opposing the first race, and wherein the friction clutch includes at least one first friction element rotatably coupled to the second race of the one-way clutch and includes at least one second friction element opposing the at least one first friction member and rotatably coupled to the second member.

10. The clutch assembly of claim 2, further including a Belleville spring engaging the friction clutch.

11. The clutch assembly of claim 2, further including a third member disposed between the first member and the second member and rotatably coupled to at least one of the friction clutch and the one-way clutch, wherein the third member selectively transmits a second torque to the first member in a first rotational direction, and wherein the first torque is transmitted from the first member to the second member in a second rotational direction.

12. A clutch assembly for transmitting a first torque between a rotatable member and a stationary member, the clutch assembly comprising:
a one-way clutch disposed between the rotatable member and the stationary member, the one-way clutch having a predetermined design torque; and
a friction clutch disposed in series with the one-way clutch between the rotatable member and the stationary member, the friction clutch having a predetermined holding torque, wherein the predetermined holding torque is less than the predetermined design torque of the one-way clutch, and
wherein the friction clutch allows rotation between the rotatable member and the stationary member when the first torque is greater than the predetermined holding torque.

13. The clutch assembly of claim 12, wherein the rotatable member is a rotatable member in a vehicle transmission and the stationary member is a stationary member in the vehicle transmission.

14. The clutch assembly of claim 13, wherein the rotatable member is a ring gear of a planetary gear set and the stationary member is a housing in the vehicle transmission.

15. The clutch assembly of claim 12, wherein the friction clutch includes at least one first friction element and at least one second friction element, the one-way clutch includes a first race and a second race, the first race of the one-way clutch is rotatably coupled to the rotatable member, the second race is rotatably coupled to the at least one first friction element of the friction clutch, and the at least one second friction element of the friction clutch is rotatably coupled to the stationary member.

16. The clutch assembly of claim 12, wherein the friction clutch includes at least one first friction element and at least one second friction element, the one-way clutch includes a first race and a second race, the at least one second friction element of the friction clutch is rotatably coupled to the rotatable member, the at least one first friction element of the friction clutch is rotatably coupled to the second race of the one-way clutch, and the first race of the one-way clutch is rotatably coupled to the stationary member.

17. The clutch assembly of claim 16, wherein one of the at least one first friction element and the at least one second friction element of the friction clutch is a pair of friction surfaces on one of the first race and the second race of the one-way clutch.

18. The clutch assembly of claim 16, further including a third member disposed between the rotatable member and the stationary member and rotatably coupled to one of the first race and the second race of the one-way clutch and rotatably connected to one of the at least one first friction element and the at least one second friction element of the friction clutch.

19. The clutch assembly of claim 12, further including at least one spring in continuous engagement with the friction clutch.

20. A clutch assembly for transmitting a first torque between a rotatable member and a stationary member in a vehicle transmission, the clutch assembly comprising:
a one-way clutch including a first race and a second race opposing the first race, wherein the first race is rotatably coupled to one of the rotatable member and the stationary member; and
a friction clutch including at least one first friction element and at least one second friction element, wherein the at least one first friction element is rotatably coupled to the second race of the one-way clutch and the at least one second friction element is rotatably coupled to the one of the rotatable member and the stationary member to which the first race of the one-way clutch is not coupled, the friction clutch having a predetermined holding torque, wherein the predetermined holding torque is less than the predetermined design torque of the one-way clutch, and
wherein the friction clutch allows rotation between the rotatable member and the stationary member when the first torque is greater than a predetermined holding torque.

21. The clutch assembly of claim 20, further including at least one biasing element continuously engaged with the friction clutch.

22. The clutch assembly of claim 21, wherein the rotatable member is a gear of a planetary gear set.

23. The clutch assembly of claim 20, further including a third member rotatably coupled to the at least one first friction element and the second race of the one-way clutch, wherein the at least one first friction element is rotatably coupled to the second race of the one-way clutch through the third member.

* * * * *